Nov. 10, 1925.  
W. H. LEISTER  
1,561,092  
MACHINE FOR DEBUTTING CORN  
Original Filed July 18, 1918   13 Sheets-Sheet 7

Witness

Inventor  
William H. Leister  
By Sturtevant & Mason  
Attorneys

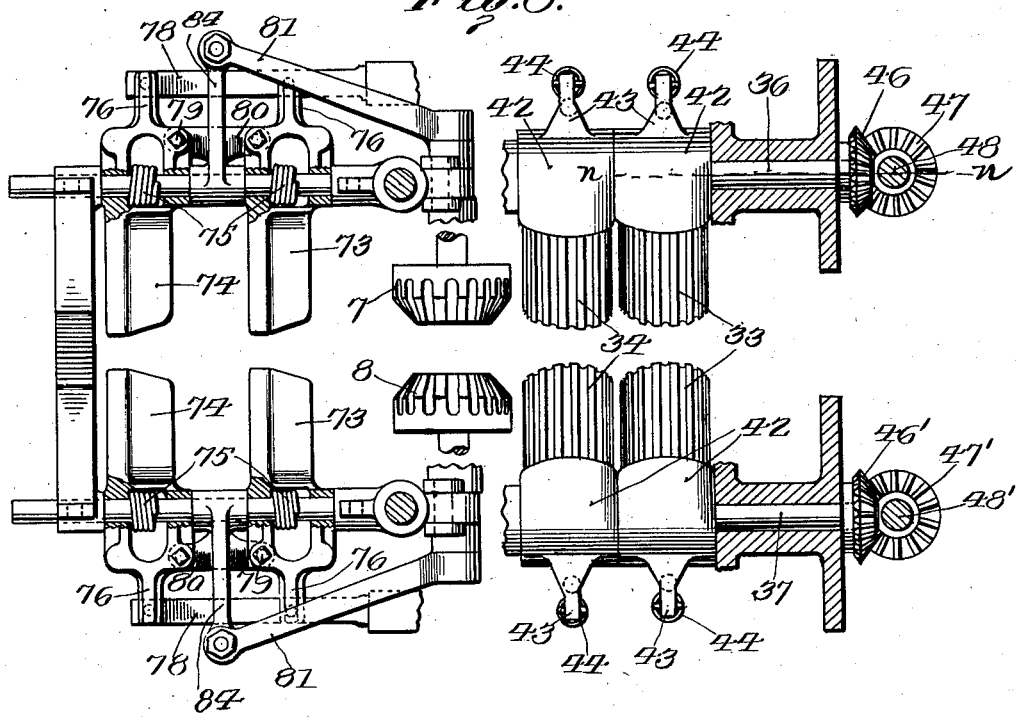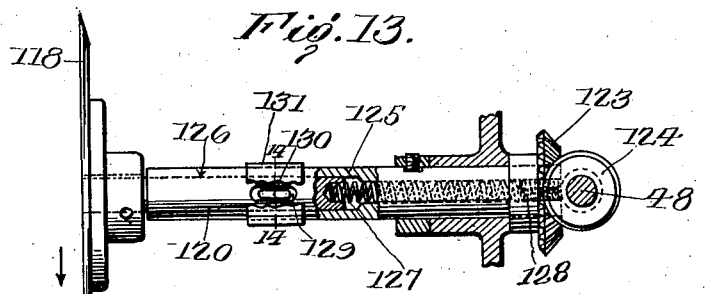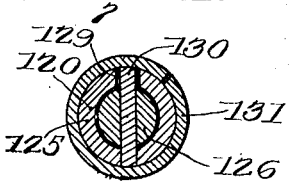

Nov. 10, 1925.
W. H. LEISTER
1,561,092
MACHINE FOR DEBUTTING CORN
Original Filed July 18, 1918     13 Sheets-Sheet 9
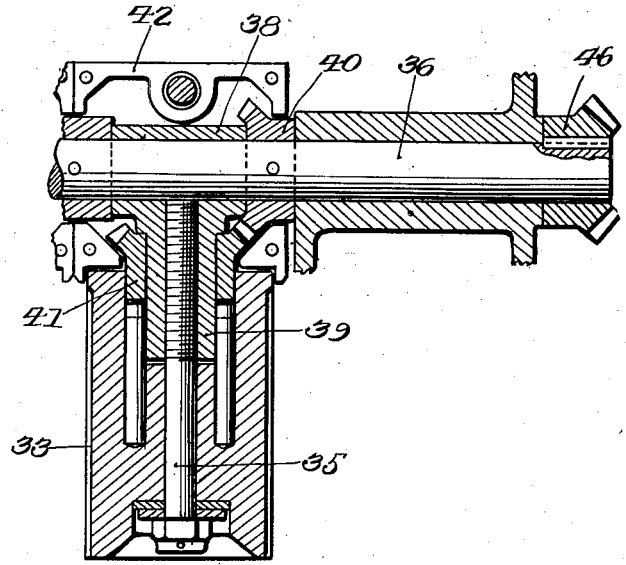
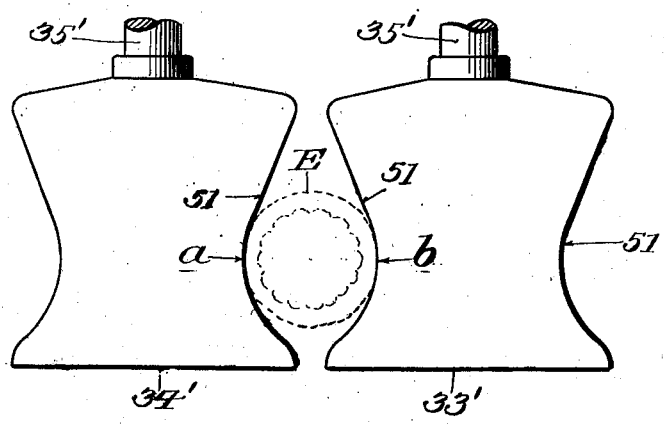

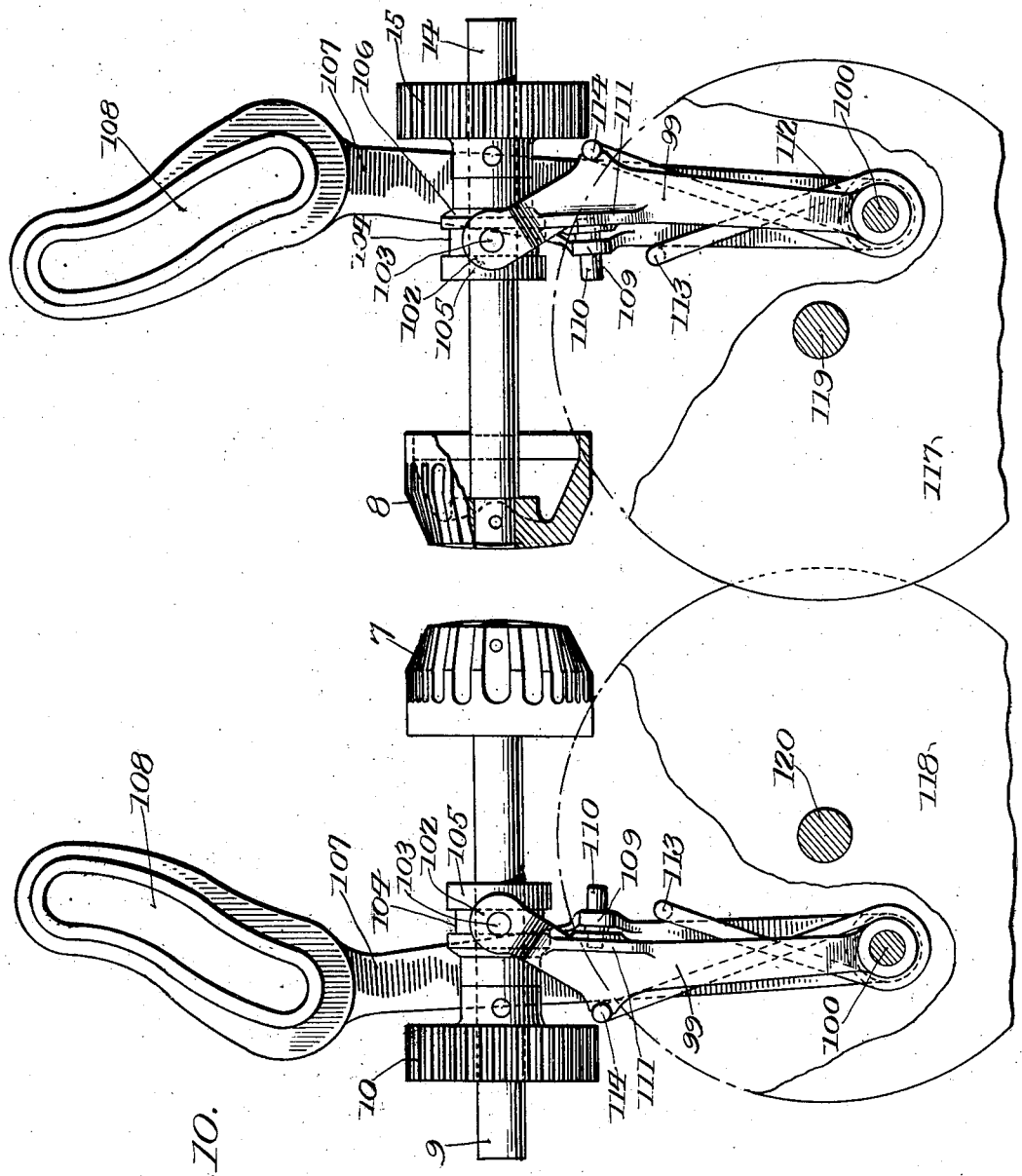

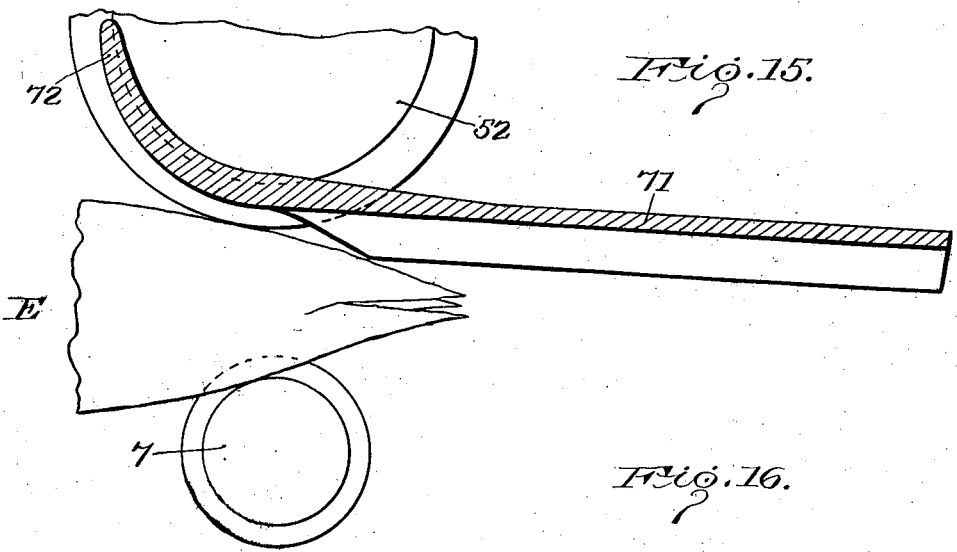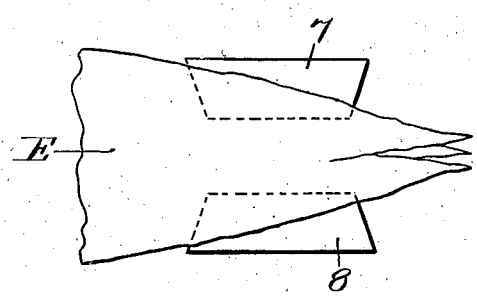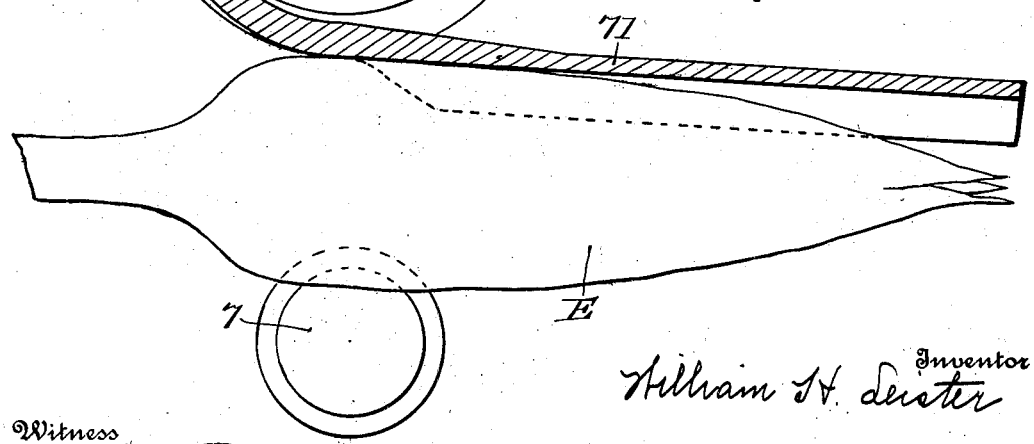

Nov. 10, 1925.  
W. H. LEISTER  
1,561,092  
MACHINE FOR DEBUTTING CORN  
Original Filed July 18. 1918  13 Sheets-Sheet 12

Witness  
Inventor  
William H. Leister  
By Sturtevant & Mason  
Attorneys

Nov. 10, 1925.

W. H. LEISTER 1,561,092

MACHINE FOR DEBUTTING CORN

Original Filed July 18, 1918   13 Sheets-Sheet 13

Witness

Inventor
William H. Leister
By Sturtevant & Mason
Attorneys

Patented Nov. 10, 1925.  1,561,092

UNITED STATES PATENT OFFICE.

WILLIAM HAMMOND LEISTER, OF WESTMINSTER, MARYLAND, ASSIGNOR TO THE UNITED MACHINERY COMPANY, OF WESTMINSTER, MARYLAND, A CORPORATION OF MARYLAND.

MACHINE FOR DEBUTTING CORN.

Application filed July 18, 1918, Serial No. 304,728. Renewed June 16, 1919.

*To all whom it may concern:*

Be it known that I, WILLIAM HAMMOND LEISTER, a citizen of the United States, residing at Westminster, in the county of Carroll, State of Maryland, have invented certain new and useful Improvements in Machines for Debutting Corn, of which the following is a description, reference being had to the accompanying drawing and to the figures of reference marked thereon.

The invention relates to new and useful improvements in machines for debutting corn and more particularly to a machine of the type shown, described and claimed broadly in my prior application Serial No. 192,367, filed September 20th, 1917.

In the machine of my prior application the ear of corn is alined for presentation to the cutting devices for debutting the ear by alining devices which are spaced but which are held in fixed relation to each other. The ear of corn passes over these alining devices point first and in endwise direction, so that the grain shoulder is approached by the alining devices from the direction of the body of the ear, which greatly facilitates the finding of the real grain shoulder and the positioning of the ear thereby, so that the butt will be severed close to the grain shoulder and without cutting into the ear of corn so as to waste the same. Ears of corn vary greatly in diameter and in some seasons this variation is greater than others. With a certain fixed setting of the alining devices, as in my prior application, ears of corn within a certain range of variation as to size may be perfectly alined for the cutting devices, but with extreme variations in the size of the ears there is some difficulty in properly alining the ear.

An object of the present invention is to provide an alining device for ears of corn wherein the spaced members serving to aline the ear are positioned or set by means controlled by the size of the ear so that when extremely large ears pass through the machine these alining devices will be set to perfectly aline the ear relative to the cutting devices and on the other hand when extremely small ears pass through the machine the alining devices will be set for perfect alinement of such ears.

A further object of the invention is to provide a setting means for the alining devices which setting means includes yielding members so that the alining devices may be positively separated and postitioned for a given diameter of ear and may then remain in this set position until the ear has passed by the alining devices even though the setting means return to its normal position.

A further object of the invention is to provide means for feeding the ear of corn to the alining devices which feeding means maintains a feeding control on the ear until after said ear is well into the alining devices which feeding means directly in rear of the alining devices is constructed so as to yield to permit the butt or stalk of the ear when of extreme length to pass vertically down through the feeding means as the ear is conveyed to the cutting devices.

Still another object of the invention is to provide means for receiving the ear after it is alined and for presenting the same to the cutting devices, which means includes two or more pairs of co-operating feeding elements so as to insure a proper handling of the ears which vary greatly in length.

Still another object of the invention is to provide a driving connection between the main shaft and the operating parts of the debutting machine which includes yielding members so that if the parts of the machine become in any way locked said members will yield to prevent breaking or bending of the parts.

Still another object of the invention is to provide a combined corn husking and debutting machine wherein the husking machine includes a plurality of separate husking units adapted to receive the ears of corn from a single debutting unit.

These and other objects will in part be obvious and will in part be hereinafter more fully disclosed.

In the drawings which show by way of illustration one embodiment of the invention:

Fig. 8 is a view partly in horizontal section and partly in top plan showing more particularly the alining devices, the feeding in rolls and the means for operating the same, and also the retarding or restraining devices for the ear;

Figure 11:
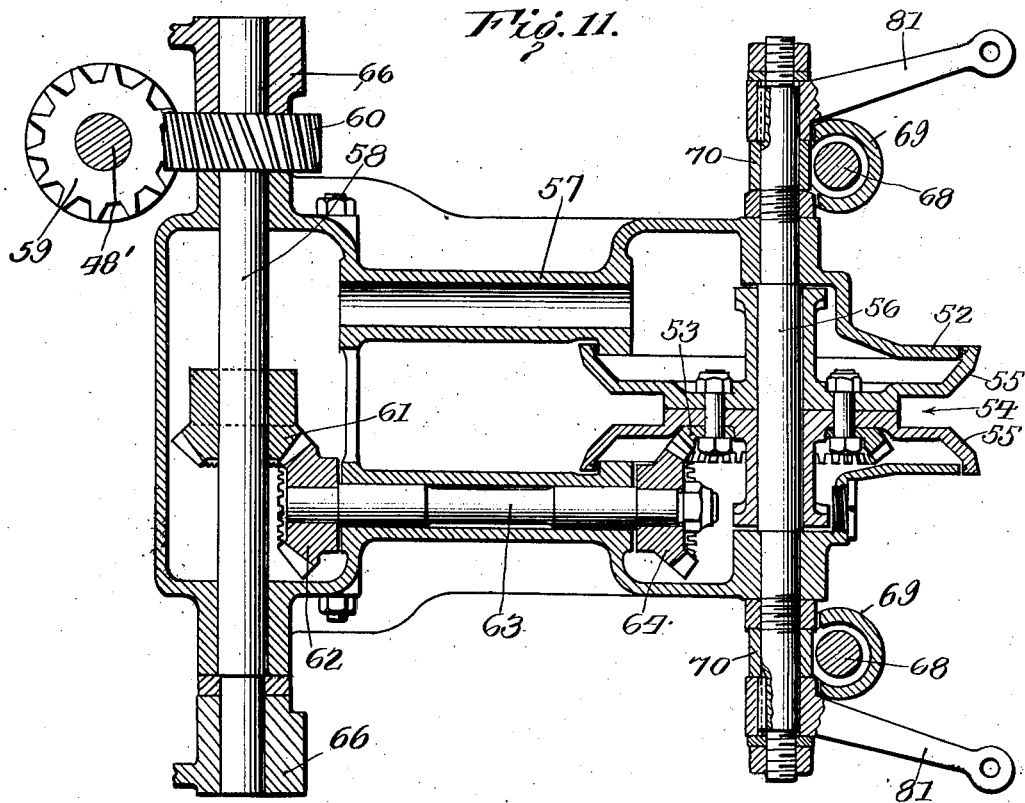
Figure 12:
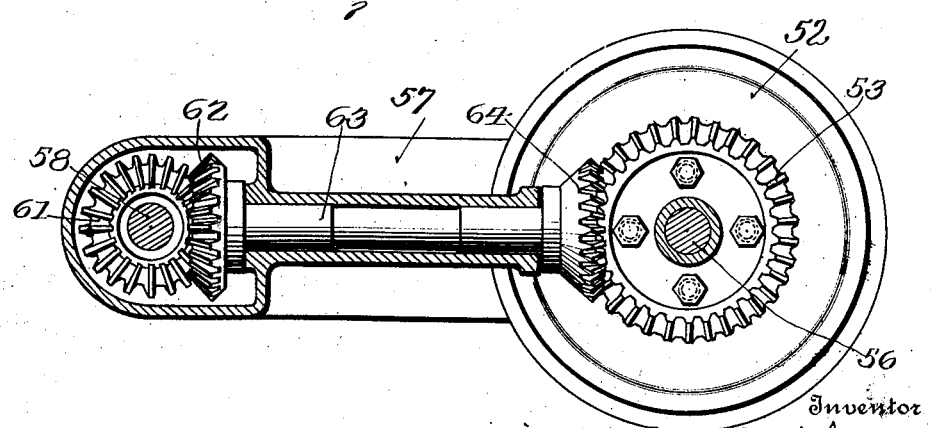
Figure 18:
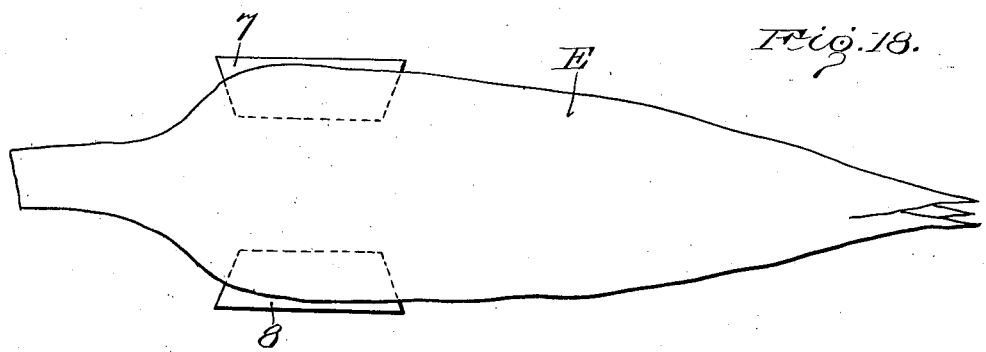
Figure 19:
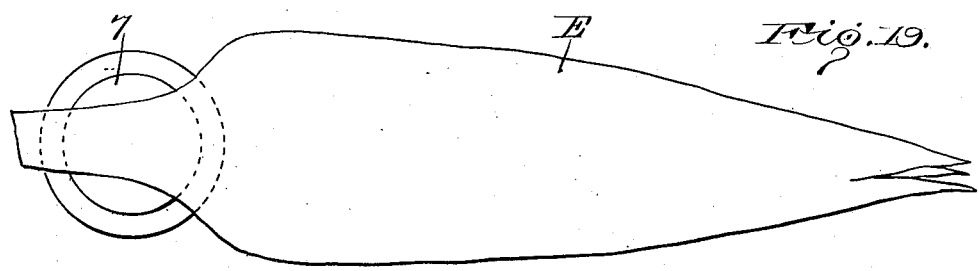
Figure 20:
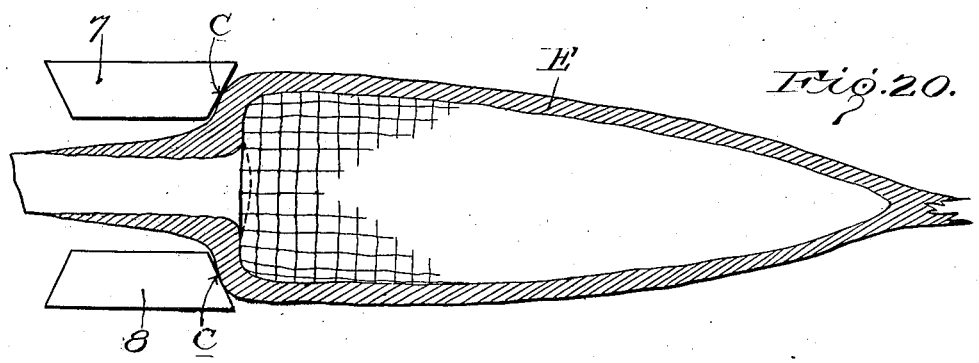
Figure 21:
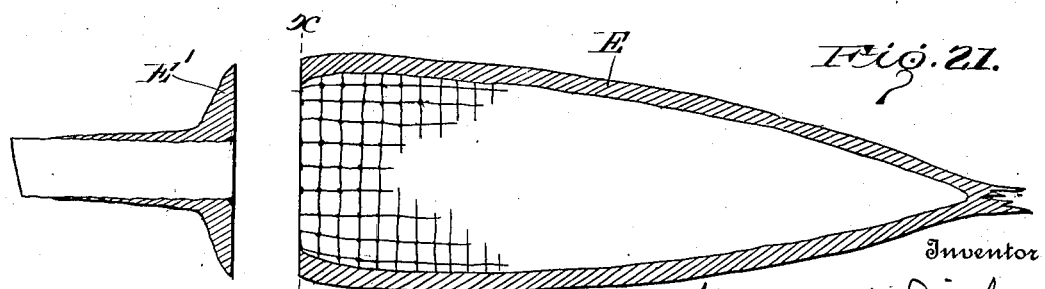

Fig. 8ª is a section on the line n—n of Fig. 8;

Fig. 9 is a detail showing a modified form of the feeding in roll;

Fig. 10 is a detail partly in section and partly in end elevation, showing the severing discs, the alining devices and the operating mechanism for positioning or setting the alining devices;

Fig. 11 is a view in horizontal section but showing the manner of mounting and operating positively the presser wheel which bears on the ear of corn as it passes from the alining devices;

Figure 12 is a sectional view showing the connecting shaft for driving the presser wheel;

Fig. 13 is a view partly in section and partly in top plan showing the severing devices;

Fig. 14 is a sectional view on the line 14—14 of Fig. 13;

Fig. 15 is a view showing more or less diagrammatically the alining devices and the presser means co-operating therewith just as the point of an ear enters between the same;

Fig. 16 is a diagrammatic view showing the alining devices with the ear in the position shown in Fig. 15;

Fig. 17 is a view similar to Fig. 15 but showing the ear well advanced between the alining devices and the presser means;

Fig. 18 is a view similar to Fig. 16 but showing the alining devices as having been separated or set for the ear of the size shown in Fig. 17;

Fig. 19 is a view showing diagrammatically the ear as fully positioned by the alining devices;

Fig. 20 is a diagrammatic plan view of the ear in the position shown in Fig. 19;

Fig. 21 is a diagrammatic view showing the point at which the ear is debutted when properly alined.

My invention relates broadly to a debutting machine having alining devices over which the ear passes point first in order that the grain shoulder might be found by approaching the same from the body of the ear. These alining devices are spaced so as to permit the stalk or butt of the ear to pass between the same. The alining devices are positively rotated. My invention as to one of its phases is directed particularly to a means for setting these alining devices so as to bring about a perfect alinement of the ear of corn regardless of its size, even though the size of the ear vary between very large extremes. The ear of corn passes over the alining devices and the grain shoulder is brought into engagement with the alining devices in the manner described in detail in my prior application above referred to. That is to say, the ear passes point first over the alining devices and as the grain shoulder reaches the alining devices the ear will change its direction of movement so as to move transversely or vertically as well as endwise, the shoulder of the ear traveling around the alining devices. Means is provided for retarding the forward movement of the ear so that the grain shoulder will be held firmly in contact with the alining devices.

These alining devices are set by a train of mechanism connected with the presser wheel and co-operating presser plate which bears on the ear as it passes over the alining devices. This presser wheel and presser plate are mounted so as to move up and down and firmly hold the ear pressed against the alining devices. The amount of movement of the presser wheel will be determined by the diameter of the ear passing between the alining devices and the presser wheel. I have mounted each alining device so that it may be shifted for setting by a movement of the alining device in a direction parallel with its axis. In other words, the axis of the alining devices always remains in the same position but the alining devices move toward and from each other. When the presser wheel is raised the train of mechanism between the alining devices and the presser wheel operates to shift the alining devices. By this means I am able to set the alining devices so as to properly position the ear by the grain shoulder regardless of the diameter of the ear and also so as to afford a proper space between the alining devices for the butt of an extremely large ear to pass to permit the alinement of the ear.

The invention consists further, broadly, in a feeding mechanism for presenting the ears to the alining devices, which feeding mechanism maintains a feed control of the ear until it is well into the alining devices. This feeding mechanism in the present embodiment of the invention consists of rotating rolls which are disposed immediately in rear of the alining devices and are operated positively so as to feed the ear along onto the alining devices. These feeding rolls are mounted so as to yield and permit an extremely long stalk or but to pass down between the same as the ear moves vertically to the debutting mechanism.

The invention also consists broadly in providing a plurality of pairs of feed chains which operate to receive the ear of corn after it has been fully alined and convey the same to the severing means for debutting the ear, said feed chains being arranged in pairs and side by side. The first or inner pair of chains are placed very close to the severing members while the other pair of chains may be set at some distance therefrom and this enables a perfect handling of the ears of different lengths so that the ears will be firmly held in horizontal position and bodily conveyed without any tilting thereof to the severing mechanism.

The invention also contemplates broadly a driving means for the various parts of the debutting machine which includes a yielding clutch so that if any of the parts of the machine are locked the clutch parts may yield and slide one on the other and this prevents bending or breaking of the parts of the machine.

The invention from another aspect includes broadly a combined husking and debutting machine wherein a plurality of husking units are used with a single unit debutting machine. These husking units are disposed relative to the severing mechanism so that the ears of corn as they fall after being released by the feed chains may drop either onto one or the other of the husking units. These husking units are directly beneath the severing members so that the ears will drop onto the husking units. A distributor may be used which will direct the ears half on one husking unit and half on the other. This prevents too rapid feeding of the husking unit and greatly increases the speed of the machine as one severing unit is capable of debutting a sufficient number of ears of corn to supply two husking units to their substantially full capacity.

Figure 7:
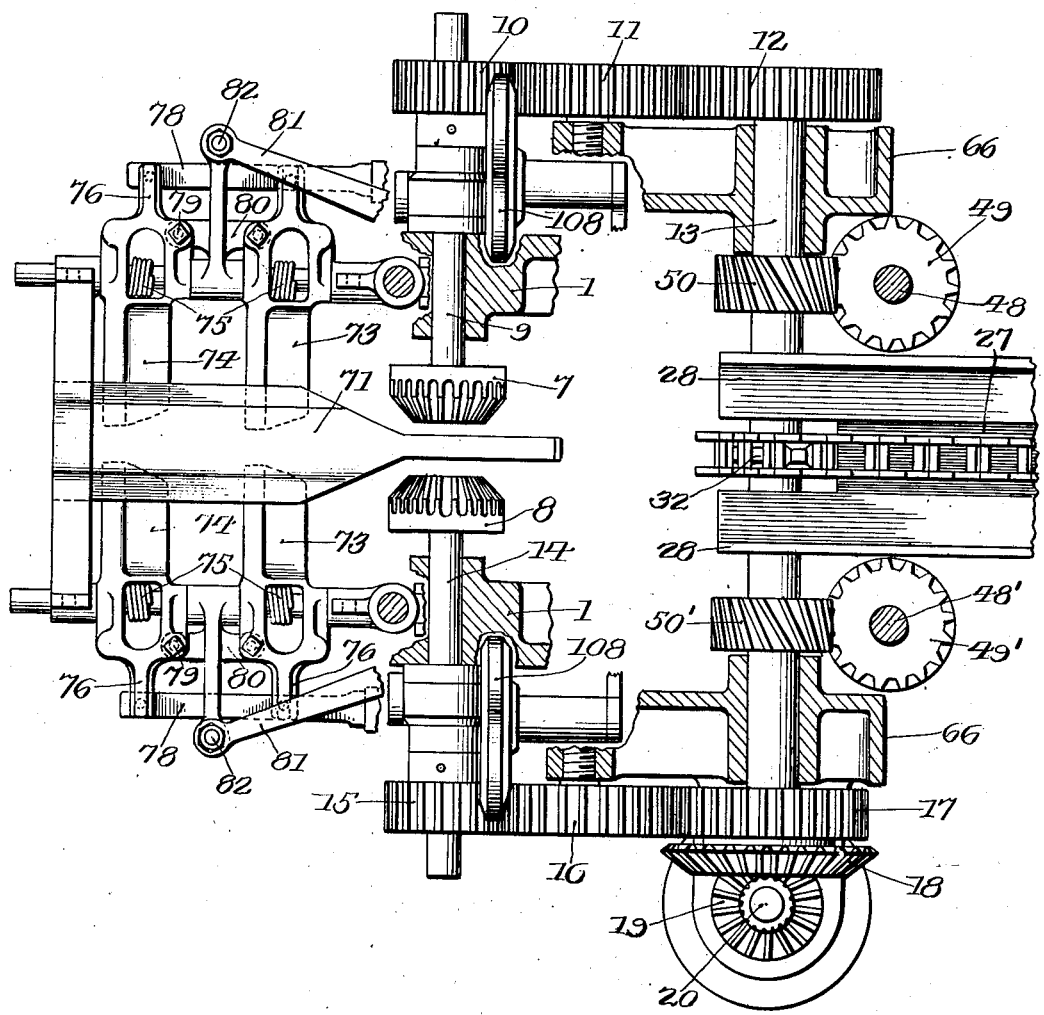
Fig. 7 is a view partly in horizontal section and partly in top plan showing the alining devices and the means for operating the same, also the presser plate and the restraining means for receiving the ear and holding the same in engagement with the alining devices.

In the drawings I have shown a machine for carrying out the broad principles of my invention. It is to be understood, however, that the invention may be embodied in other types of machines and in other mechanisms varying greatly in details from that herein shown, the illustration being purely for the purpose of showing one way of carrying out the invention. Referring to these drawings in detail, I have shown the invention as embodied in a machine having a supporting frame 1 in which is mounted a main driving shaft 2. This driving shaft is operated by a belt from any suitable source of power. Associated with the driving pulleys of the main shaft 2 is a belt shifter 4 operated by a shaft 5 and a hand lever 6. It is understood, of course, that these parts may be of any desired construction. Mounted in the main frame 1 is a pair of alining devices 7 and 8. The alining device 7 is carried by a shaft 9 which is mounted to slide endwise in the frame 1. On the outer end of the shaft 9 is a gear wheel 10 which is keyed to the shaft and this gear wheel 10 meshes with an intermediate gear wheel 11 which in turn meshes with a gear wheel 12 on a shaft 13 (see Figure 7). The alining device 8 is carried by a shaft 14 which is also mounted so as to slide endwise in the frame 1. Keyed to this shaft 14 is a gear 15 which meshes with an intermediate gear 16 and this intermediate gear meshes with a gear 17 also mounted on the shaft 13. The shaft 13 carries a bevel gear 18 which meshes with a bevel gear 19 on a vertical shaft 20. The vertical shaft 20 carries a bevel gear 21 at its lower end which meshes with a bevel gear 22' on the main shaft 2. The shaft 20 is made in two sections which are coupled together by a multiple disc friction clutch 22, (see Figure 4 of the drawings). This multiple disc clutch is held closed by a spring 23 which bears against a fixed collar 24 secured to the lower section of the shaft 20 and against a movable collar 25 which is a part of the clutch mechanism. This spring causes the discs of the clutch to yieldingly engage each other so that the motion of the main shaft will be imparted to the upper section of the shaft 20 and thus to the shaft 13 operating the alining devices. The other parts of the machine are also operated from this shaft 13. If for any reason the parts operated by the shaft 13 become locked, then the friction clutch 22 will slip, thus preventing any bending or breaking of the parts operated by the shaft 20. It is understood, of course, that the spring 23 and the multiple disc clutch controlled thereby ordinarily turns the upper section of the shaft 20 as one with the lower section of the shaft.

The ears of corn are fed over the lining devices 7 and 8 point first. The ears are placed on a receiving table 26. This receiving table is provided with a bottom portion 28, (see Fig. 4 of the drawings). The receiving table is mounted on a bracket 29 which is bolted to the frame 1 of the machine by suitable bolts. Sliding along the bottom 27 of the receiving table is a feed sprocket chain 30. Said sprocket chain travels over a roll 31 at the outer end of the table and over a sprocket wheel 32 mounted on the shaft 13. This sprocket chain is positively driven and in a direction so as to slide along the table 26 and convey ears to the alining mechanism. It is understood that the ears may be placed by hand or otherwise on this feeding in table and are placed with their points forward so that they will be carried point first over or into the alining mechanism. The ear of corn after the grain shoulder reaches the alining devices is carried forwardly and downwardly to full alined position and then is clamped by feed chains and carried to the severing or debutting mechanism. The projecting stalk or butt extending rearwardly from the body of the ear passes down between the alining devices. In order to provide a free space for the downward movement of this projecting stalk or butt, the table 26 terminates at a point a considerable distance back from the alining devices, as clearly shown in Figure 7 of the drawings.

Figure 2:
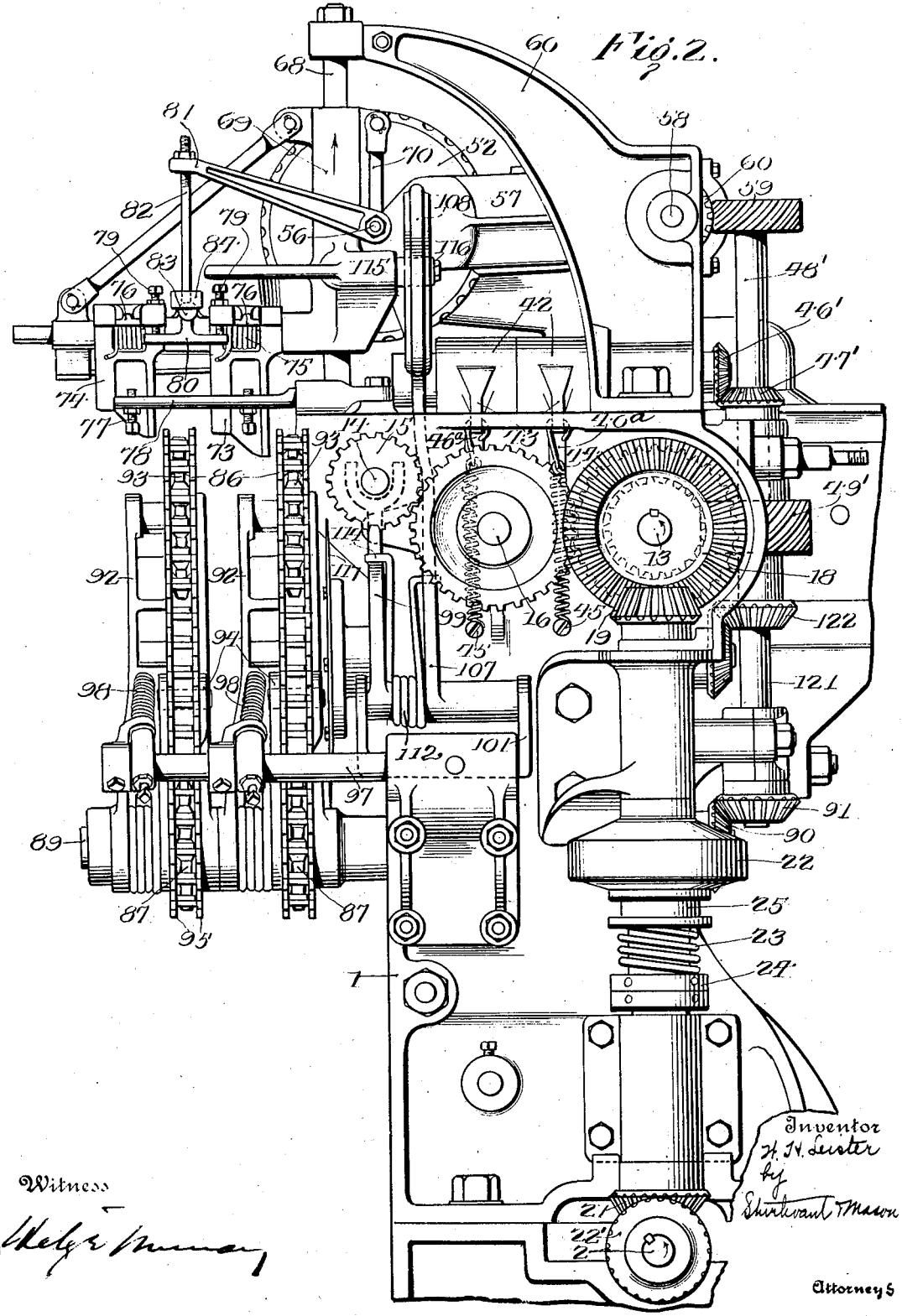
Fig. 2 is an enlarged side view of a portion of the machine viewed from the opposite side from that shown in Fig. 1, the head being raised.

As a means for feeding the ear from the table to the alining devices I have provided a plurality of pairs of feeding rolls 33—33 and 34—34. These rolls are positively operated and receive the ear which is moved onto the same by the feed chain and as the rolls turn they will carry the ear onto the alining devices 7 and 8. In Figure 8ª of the drawings I have shown in detail one of these rolls and the driving means therefor. Let us suppose it to be one of the rolls 33. The roll 33 rotates about a fixed supporting shaft or rod 35. The rolls 33 and 34 at one side of the machine are carried by a shaft 36 while the rolls 33 and 34 at the other side of the machine are carried by a shaft 37. Journaled loosely on the shaft 36 is a T-head or bracket 38. This T-head or bracket has a downwardly extending sleeve 39 which receives the fixed shaft or rod 35. Said shaft may be threaded into this sleeve. Keyed to the shaft 36 is a bevel gear wheel 40. This gear wheel 40 meshes with the bevel gear wheel 41 which is keyed to the roll 33. Extending about the bevel gear 40 and also about the bevel gear 41 is a housing 42. Extending outwardly from the housing is an arm 43. A spring 44 is secured at its outer end to the housing 43 and at its lower end to the frame of the machine, as at 45 (see Fig. 2 of the drawings), and this spring normally pulls the arm 43 downwardly until it rests against a stop 46ª. When in this position the rolls 33 and 34 are inclined to each other forming in a measure a trough which receives the ear from the sprocket chain and conveys the same to the alining rolls. The rolls may readily yield downwardly stretching the springs 45 and moving the arms 43 away from their stops. This permits the stalk or butt of the ear to pass downwardly between the rolls and after it has passed the rolls they will at once spring back to their normal position.

The shaft 36 carries a bevel gear 46 which meshes with a bevel gear 47 on a vertical shaft 48. This vertical shaft 48 is provided with a spiral gear 49 which meshes with a spiral gear 50 on the shaft 13. The shaft 37 is provided with a similar bevel gear 46' meshing with a bevel gear 47' on a vertical shaft 48'. This vertical shaft 48' carries a spiral gear 49' meshing with a spiral gear 50' on the shaft 13. Thus it will be seen that the feed rolls 33 and 34 are all positively rotated and yet said wheels will yield bodily to permit the stalk or butt to pass down between the same, as above noted. This insures that the ear of corn will be caused to travel continuously after it is placed on the feed table until it is brought to alining position. Even though the ear be extremely short it will not stop, but will be positively moved along by the feeding mechanism.

In Figure 9 of the drawings I have shown a modified form of feed roll for feeding the ears from the feed table to the alining devices. The feed rolls in this form of the invention are mounted to rotate upon substantially vertical axes and the surface of each roll is concave in cross section, so as to grip the ear at opposed points. In this figure the rolls are indicated at 33' and 34'. These rolls are carried by shafts 35' which may be rotated in any suitable manner and are supported at their upper ends, so that the rolls 33' and 34' may move toward and from each other, means being provided for yieldingly forcing the rolls to an inner limited position. The surface of each roll is concave in cross section, as indicated at 51. In this figure of the drawings I have indicated in dotted lines the ear at E. It will be noted that this ear is gripped by the rolls 33' and 34' at the opposite points *a* and *b*. By this form of feed rollers the ear is gripped and positively fed forward. As the ear passes over the alining devices, it passes underneath a presser wheel which is yieldingly forced downwardly to a limited position and this positive feeding of the ear by the rollers 33' and 34' insures that the point will pass sufficiently between the presser wheel and the alining devices to be gripped thereby and fed on.

Located directly above the alining device 7 and 8 is the presser wheel 52. This presser wheel, as clearly shown in Figure 11 of the drawings, is formed in two parts bolted together and fixed to the presser wheel is a bevel gear 53. Between the two parts of the wheel there is a space 54 and the extreme outer edges of the wheel are beveled as at 55. The presser wheel 52 is freely mounted on a shaft 56. This shaft 56 is fixed to a frame 57, which is mounted to turn about a shaft 58. The shaft 48' is extended above the devices for operating the feeding-in rolls and carries a worm gear 59. This worm gear 59 meshes with a worm gear 60 on the shaft 58. Mounted on the shaft 58 is a bevel gear 61, which meshes with a bevel gear 62 on the cross shaft 63 and this cross shaft 63 carries a bevel gear 64 meshing with the bevel gear 53. Through this train of mechanism the presser wheel 52 is positively rotated in a clockwise direction, as viewed in Figure 2 of the drawings. The frame 57 carrying this presser wheel freely pivots about the shaft 58, so that it may be swung up and down on the shaft.

Figure 3:
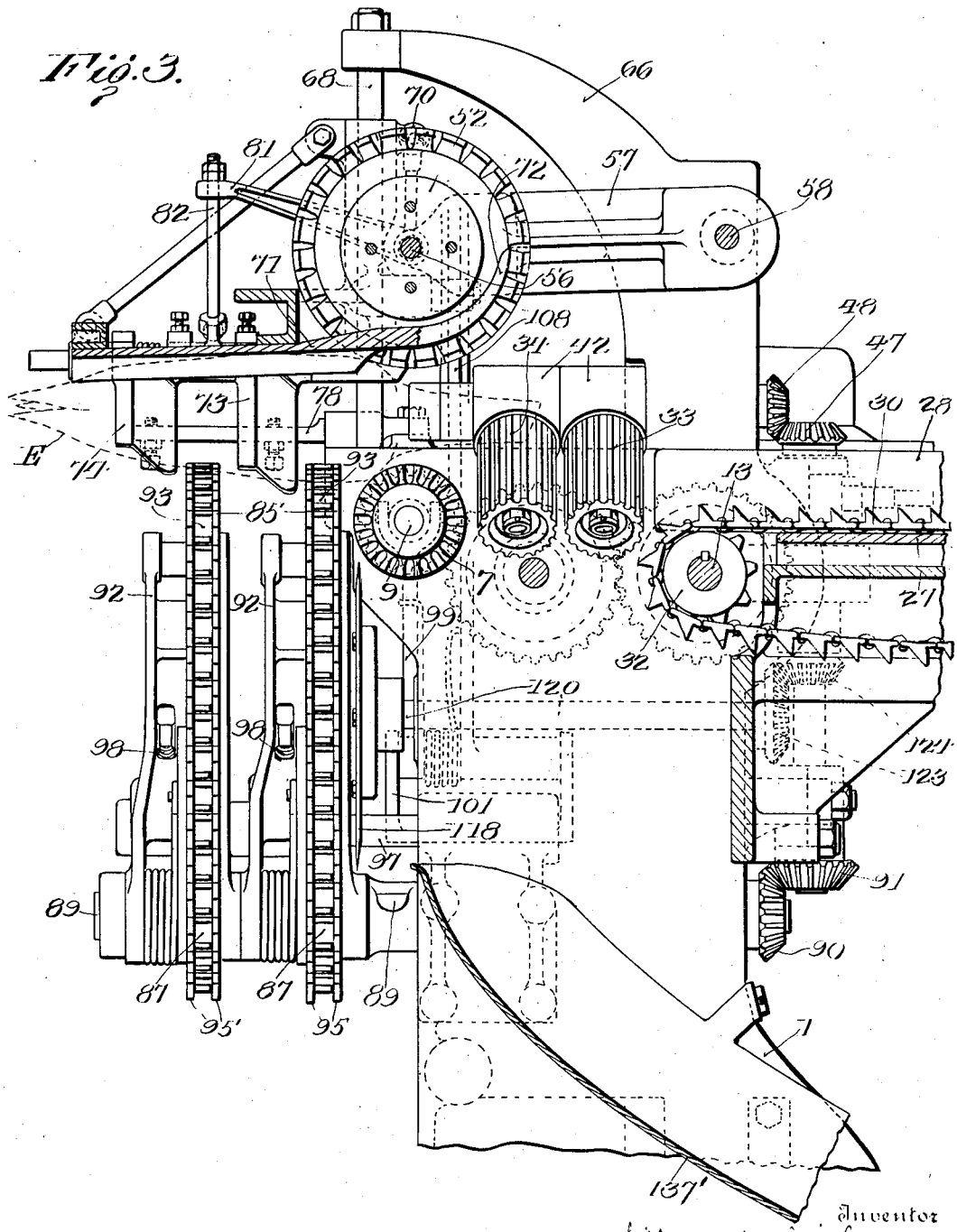
Fig. 3 is a vertical sectional view centrally through the machine and viewed from the same position shown in Figure 2.
Figure 4:
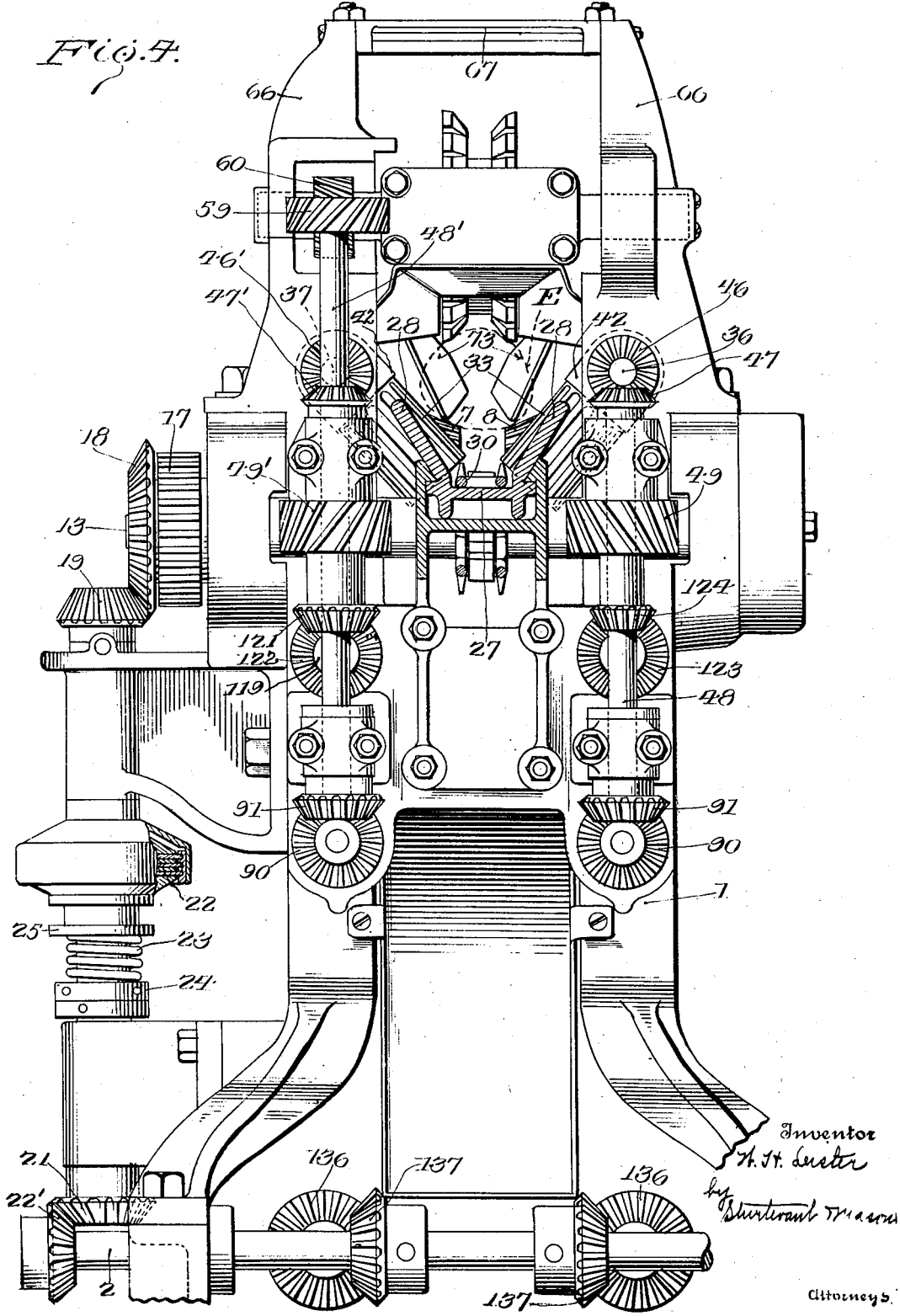
Fig. 4 is a view partly in vertical section and partly in end elevation of the machine from the receiving side thereof with an ear part way over the alining devices.

Mounted on the main frame 1 of the machine is a pair of brackets 66, one at each side of the machine. These brackets are connected by a cross beam 67, (see Figure 4 of the drawings). Mounted in the ends of the brackets are vertical standards 68. Mounted to slide on these vertical standards is a cross head 69. Links 70 are pivoted to this cross head and also pivoted to the frame 57, so that as the presser wheel moves up and down by reason of the ear passing underneath the same, this cross head will be raised and lowered. Mounted on the cross head is a presser plate 71. The presser plate 71 is formed with a rearwardly projecting guide finger 72, which is curved to conform to the center of rotation of the presser wheel and extends into the recessed portion 54 in said presser wheel. This presser plate moves up and down bodily with the presser wheel. It is rigidly attached to the cross head so that it does not rock but moves bodily vertically. The presser plate 71 is curved in cross section and the ear passing over the alining devices passes underneath the presser wheel 52 and this presser plate 71. In Figure 3 I have shown in dotted lines the ear underneath the presser plate and just reaching its alined position on the alining devices. Also carried by the cross head 69 are restraining or retarding plates 73 and 74. These retarding plates are pivotally supported by the cross head so that they may swing thereon. They are also inclined as shown in Figure 4, so that the ear passes above the retarding plates and underneath the presser wheel and presser plate 71. The retarding plates 73 and 74 are freely pivoted on the cross head.

Figure 5:
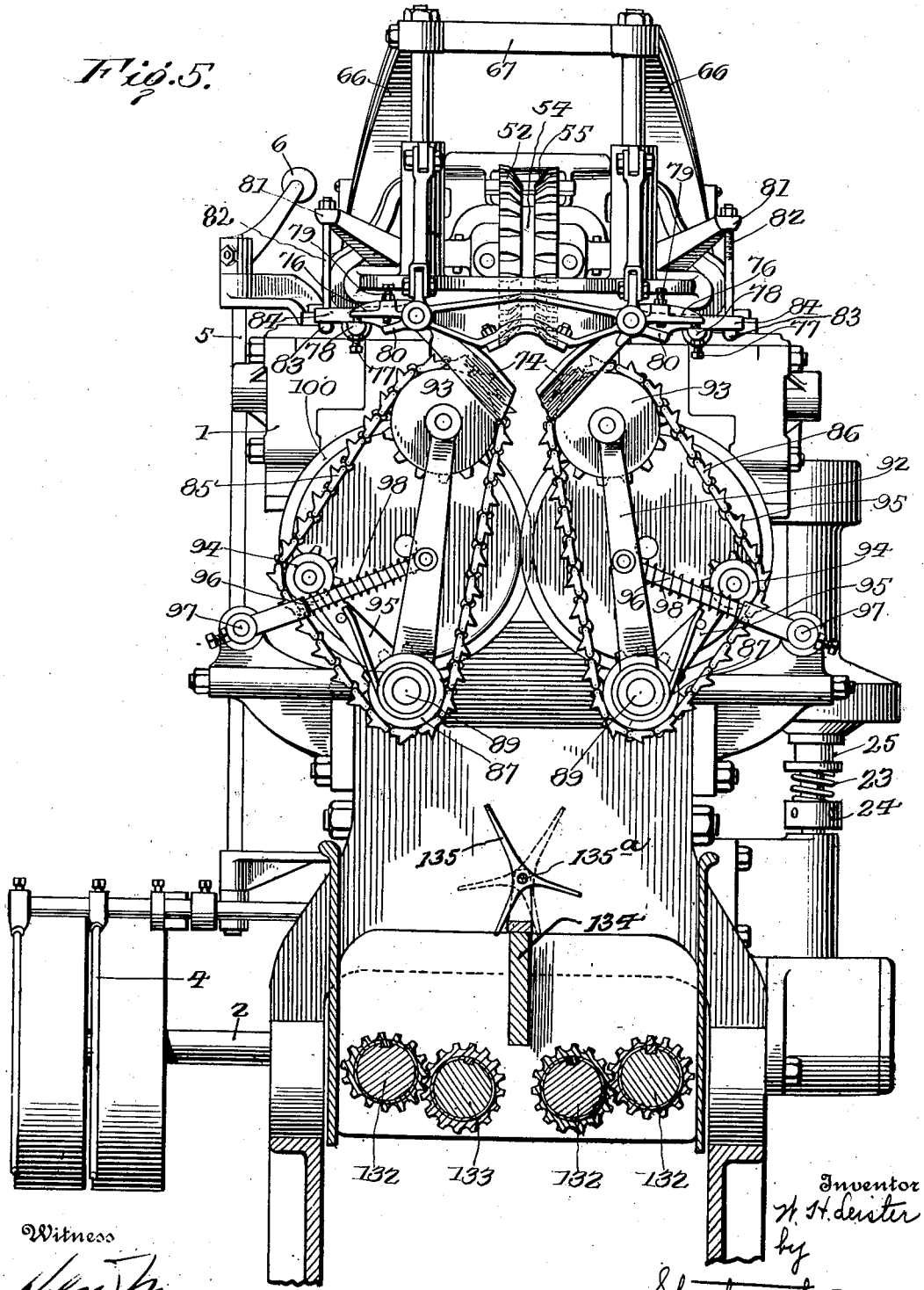
Fig. 5 is a view partly in section and partly in end elevation of the machine from the delivery side thereof.
Figure 6:
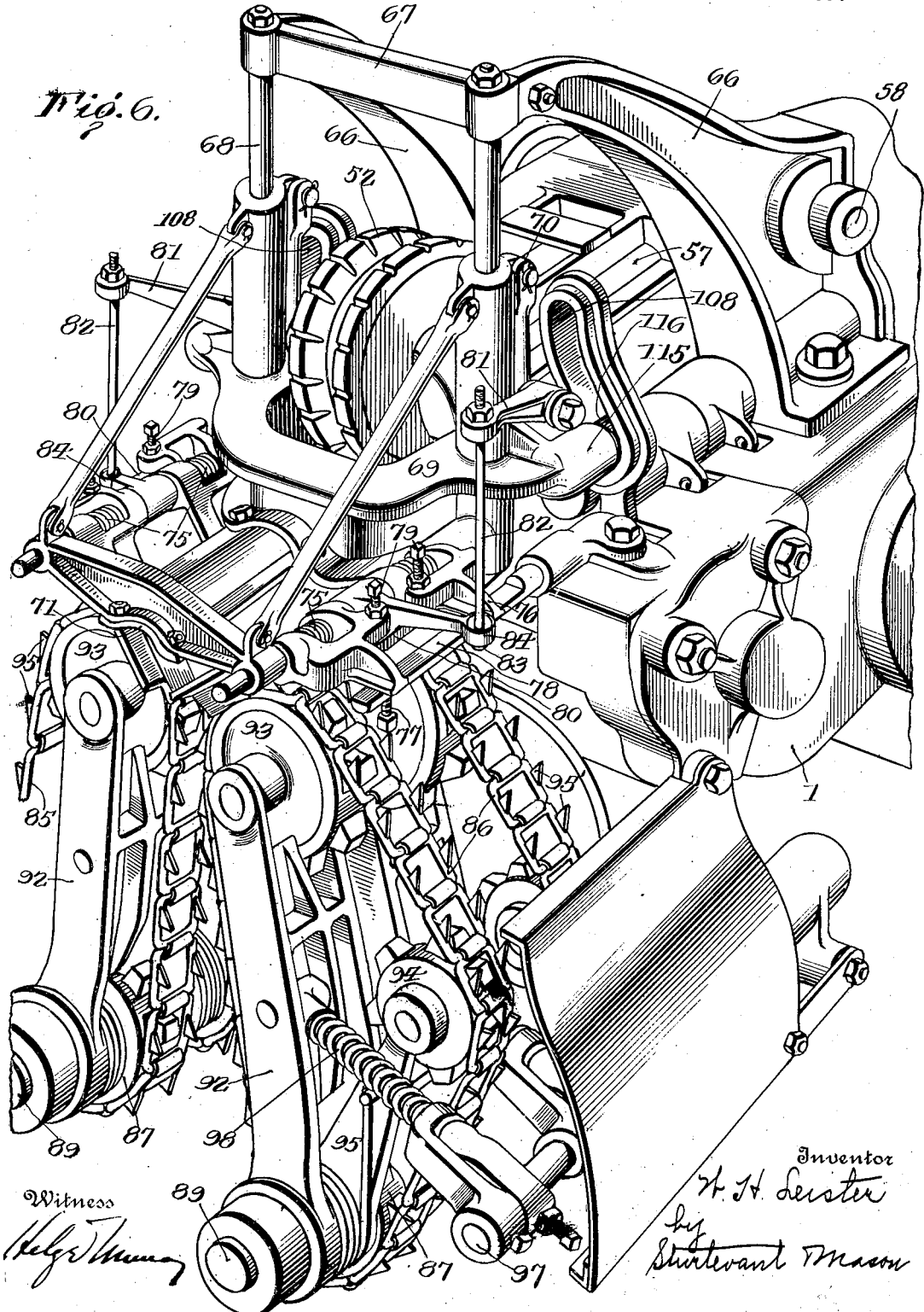
Fig. 6 is a perspective view of a portion of the head of the machine, showing more particularly the presser wheel, the cams for position the alining devices and the means operated thereby and the feed chains for conveying the ear to the severing means.

Springs 75 operate upon these retarding plates to normally raise the same until arms 76 carried by each plate engage limiting stops. When the cross head is in its extreme lowest position, as shown in Figure 5 of the drawings, these arms 76 rest on adjustable screws 77 carried by the frame of the machine. Said screws are preferably mounted on a bracket rod 78, one at each side of the machine. When the cross head is raised then the spring will turn these retarding plates about their pivotal supports, raising the inner ends thereof until the screws 79 engage stops 80 carried by the cross head. Rigidly fixed to the frame 59 at each side of the machine is an arm 81. This arm moves up and down with the frame 59 and the end of the arm will, of course, swing about the shaft 58 as a center. Extending downwardly from the end of each arm is a rod 82 which has a ball 83 at the lower end thereof. This rod extends through a bracket arm 84 pivotally mounted on the cross head. The stops 80 referred to above as carried by the cross head are carried by these arms 84. The operation of these retarding plates in connection with the cross head is as follows:

When the ear of corn passes underneath the presser wheel the presser wheel will be raised and this will lift the cross head. On the first upward movement of the cross head the arm 76 carried by the retarding plates will be moved out of contact with the stop screws on the frame and as a result the springs will swing the retarding plates until the stop screws 79 engage the limiting stops 80. A further upward movement of the cross head carries the pivotal support for the retarding plates upwardly. These retarding plates will move upwardly at the same rate of speed as the center of the presser wheel 52 as the cross head moves bodily vertically through the link connection 70 with the shaft carrying the presser wheel 52. The outer end of the arms 81, however, swinging about the shaft 58 as a center will move through a greater distance than the shaft carrying the presser wheel 52 and as a result the lower ends of the rods 82 will engage the arms 84 and lift the limiting stops 80 and through the screws 79 raise the outer ends and lower the inner ends of the retarding plates. Through this means the retarding plates are lowered an amount predetermined by the diameter of the ear passing underneath the presser wheel 52. In other words an ear of a certain diameter passing underneath this presser wheel will raise it a fixed distance and this will lower the retarding plates a predetermined distance to insure the passage of the ear over the retarding plates. These retarding plates restrain the forward movement of the ears sufficiently to cause the grain shoulder to seat against the alining devices and together with the downward pressure of the presser plate and presser wheel will crush the more or less loose husks so as to insure that the actual grain shoulder of the ear will be brought firmly against the alining surfaces of the alining devices and the ear positioned thereby.

The ears are fed to the severing devices by feed chains 85 and 86. There are two co-operating feed chains 85 and two co-operating feed chains 86. These feed chains are all similar in construction, are similarly mounted and similarly operated. Each feed chain runs over a sprocket wheel 87 mounted on a shaft 89, journaled in the main frame 1 and rotated by a bevel gear 90 which meshes with a bevel gear 91 on the vertical shaft operating the feeding in rolls and also operating the presser wheel 52. Mounted to swing freely on the shaft 89 is a frame 92 in the upper end of which is mounted a sprocket wheel 93. The feed chains run over these sprocket wheels 93. There is also an idler 94 carried by an arm 95 which tends to keep the chain taut. These feed chains are provided with projecting teeth 95. The frames 92 are each pivoted to a rod 96 which has a sliding engagement with an abutment rod 97. A spring 98 normally operates to force the frame 92 forward to a limited position. In this limited position the upper ends of the feed chains are slightly spaced from each other. The ears of corn, as above noted, lift the presser wheel and the presser plate and also the cross head. The retarding plates are depressed but are above the path of travel of the teeth on the feed chains. As the corn shoulder passes over the center of the alining devices the ear will gradually move downward lowering the cross head. If the ear is of sufficient diameter to hold the retarding plates open to a sufficient extent the teeth of the feed chains will engage the ear as it reaches the alined position, that is, a point where the grain shoulder is in a horizontal line with the axis of the shafts carrying the alining wheels. This gripping of the ear will move it bodily directly downwardly and the retarding plates will yield to permit the ear to pass between the same. If, however, the ear is a very small ear so that the retarding plates are opened or shifted relative to the cross head to a very limited extent, then when the cross head descends the stops 77 will engage the arms 76 and turn the retarding plates about their pivotal supports sufficiently to cause the teeth of the feed chains to pass above their upper surfaces, engage the ear and feed it to the severing devices. This particular construction of retarding plate, the cross head for supporting the same and the manner of operating the retarding plates and also the specific mounting of the feed chains form no part of my invention except as they provide a convenient retarding means for the ear to hold the same in proper position relative to the alining devices and except as the chains operate to grip the ear at more than one point in the lengthwise direction of the ear. These features and also many other details of construction in the present embodiment of my invention are the invention of other parties.

I will now describe the means for positioning or setting the alining devices 7 and 8 for ears of corn of different diameters of sizes. As above noted the shafts 9 and 14 carrying the alining devices 7 and 8 respectively are mounted so that they may be moved endwise in the supporting frame 1. The trains of mechanism for moving these shafts endwise are similar in construction, each train of mechanism includes an arm 99 which is freely pivoted on a rod 100 carried by a bracket 101 secured to the frame. This arm 99 is formed with a yoke 102 at its upper end which yoke is provided with pins 103 adapted to engage a collar 104 loosely mounted between collars 105 and 106 secured to the shafts carrying the alining devices. The collar 104 is free on the shaft so that the shaft may rotate in this collar but the arm 99 will determine the endwise position of the shaft. In other words, as the arm 99 moves back and forth the shaft to which it is connected will be moved endwise. Also loosely mounted on the rod 100 is a lever 107 which is formed with a cam slot 108 at its upper end. The lever 107 is provided with an arm 109 carrying a pin 110 which is adapted to engage a shoulder 111 on the arm 99. As viewed in Figure 10 of the drawings, when the lever 107 is moved to the right this pin 110 will engage the shoulder 111 and move the shaft 14 to the right. The lever 107 at the opposite side of the machine will be moved to the left as the cam slot 108 is oppositely formed from that shown in the lever at the right of this figure so that the shafts 9 and 14 will be moved by these levers 107 in opposite directions. A spring 112 is coiled about the rod 100 and one end of said spring bears at 113 against the lever 107 and the other end bears at 114 against the arm 99. These springs are arranged so as to press the shafts 9 and 14 respectively, endwise and in a direction to move the alining rolls toward each other.

The cross head 69 is provided with arms 115 carrying rollers 116 which engage the cam slots 108. As this cross head is raised these rollers operating upon the cam slots will operate to shift the shafts 9 and 14 endwise so as to move the alining devices 7 and 8 away from each other. The distance that these alining devices are moved depends upon the diameter of the ear of corn passing underneath the presser wheel and the extent to which said ear of corn lifts said presser wheel 52. Thus it will be seen that the alining devices will be set or positioned for alining an ear by the ear itself. When the cross head drops by reason of the ear passing downwardly as the grain shoulder follows around the alining devices, the levers 107 will be moved inwardly or toward each other, but owing to the yielding connection in the spring 112 between these levers and the arms 99, the devices 7 and 8 will not move in until the ear of corn is freed from engagement therewith. In other words, after the alining devices are once set for a given size ear they remain substantially in this set position until the ear has been fully alined thereby and has been fed on to the severing means. It is understood, of course, that the gear wheels 10 have a sliding engagement with the gear wheel 11 and the extent of movement of the shaft 9 is not sufficient to move these gears out of mesh. The same is true of the gear wheels 15 and 16 operating the shaft 14.

The butt is severed from the ear of corn by co-operating rotating severing devices 117 and 118 (see Figs. 10 and 13). The severing device 117 is carried by a shaft 119, while the severing device 118 is carried by a shaft 120. The shaft 119 carries a bevel gear 121 which meshes with a bevel gear 122 mounted on the shaft 48'. The shaft 120 carries a bevel gear 123 which meshes with a bevel gear 124 carried by the shaft 48. The shaft 120 is preferably made in two sections 125 and 126, which have telescoping connections with each other. A spring 127 located within the section 125 bears at one end against the section 126 while the other end of the spring bears against an adjusting screw 128. This spring normally presses the cutting disc 118 outwardly and holds it in co-operative relation against the cutting disc 117. The section 125 is slotted at 129 and a pin 130 extended through the section 126 and into this slot 130, couples the two sections of the shaft so that they turn as one and a sleeve 131 holds the pin in place.

The operation of my debutting machine is thought to be obvious from the above description, when taken in connection with my prior application. The ears of corn are laid on to the feeding-in table point first and are fed endwise by the feed chain running over the table onto the feed rollers 33 and 34 and by the feed rollers onto the alining devices 7 and 8 and underneath the presser wheel 52. The presser wheel 52 and the alining devices are positively driven and the ear will be carried forward by these moving parts, the presser wheel running up onto the ear and lifting as the ear gradually passes underneath the same. The point of the ear passing underneath the presser wheel 70 passes beneath the presser plate 71 and over the retarding plates 73 and 74. The lifting of the cross heads causes the retarding plates to open or move downwardly from the presser plate, so as to ensure that the ear will enter above the plates, although the retarding plates engage the ear sufficiently to retard the forward movement thereof and hold the ear in proper contact with the alining devices. As the ear passes over the alining devices through the raising of the presser wheel 52, it will set the alining devices 7 and 8 a predetermined distance apart depending upon the diameter of the ear. The grain shoulder is approached by the alining devices having a relative movement along the body of the ear from the point toward the grain shoulder. Thus the presser wheel and the alining devices feel the way along the body of the ear more or less crushing and loosening the husks until the grain shoulder proper passes over the high point in the alining devices, when the husks immediately in rear thereof will be crushed and the grain shoulder will follow along with the movements of the rotating alining devices hugging tightly against the surface thereof. The ear now moves forward and downwardly until the grain shoulder reaches a horizontal line passing through the axis of the shafts carrying the alining devices. This is the extreme forward movement of the ear and this is the alined position for the ear. As the ear begins its downward movement the cross head moves downward for the reason that the presser wheel and the presser plate move downward. This downward movement of the cross head carries the ear bodily downwardly until it is gripped by the feed chains. If the ear is a long ear it will be gripped at two points by the front and by the rear feed chains and as these feed chains travel together the ear will be bodily lowered without endwise movement to the severing devices. If the ear is a relatively small ear then the inner feed chains may possibly alone grip the ear and carry the same down to the severing mechanism. Inasmuch as two pairs of feed chains are used the inner chains may be placed quite close to the severing devices so as to insure the carrying of the ear forward after it is alined by a bodily movement without any tilting or inclining of the ear so as to insure that the butt will be severed in a plane at right angles to the longitudinal axis of the ear.

In Figures 15 to 21 of the drawings I have shown more or less diagrammatically the operation of the ear on the alining devices and the setting of the alining devices for an ear of a given diameter. In Figures 15 and 16 the alining devices are in their normal innermost position and in this connection it will be noted that inasmuch as they are shifted from each other for larger ears they may be set relatively close together for very small ears. In order to perfectly aline an ear of corn it is essential that the grain shoulder shall engage the alinging devices at points relatively near the inner faces of the respective alining devices. This will be apparent from Figure 20 of the drawings from which it will be noted that the alining points on the alining devices are indicated at *c*. Therefore, the distance between the points *c* on the two alining devices should be substantially the same as the diameter of a circle containing the grain shoulder. In Figure 16 the alining devices are as above noted at their innermost position, and the normal alining points on the alining devices are, therefore, substantially the same distance apart as the diameter of a circle containing the grain shoulder. This would take care of an ear passing through the machine which practically did not raise the presser wheel to any extent. It is understood, of course, that the downward movement of the presser wheel is limited by the cross head coming in contact with the frame and the weight of the parts carry the presser wheel downwardly. Let an ear of any diameter greater than the smallest ear which could be taken care of by the machine pass underneath the presser wheel and the presser wheel will then be lifted as shown in Figures 17 and 18. This lifting of the presser wheel through the train of mechanism described above, moves the points *c, c*, which are the normal alining points of the alining devices, away from each other so that the distance now between these points is substantially the diameter of a circle containing the grain shoulder of an ear of the diameter indicated in these figures. As the grain shoulder follows along the alining devices being held snugly against the same by the retarding plates, the husks will be crushed and the grain shoulder brought against the alining devices. When the grain shoulder reaches the position shown in Figures 19 and 20, further forward movement of the ear ceases and the ear is perfectly alined for presentation to the severing devices. This shifting of the alining devices to correspond to the diameter of the circle containing the grain shoulder, may be referred to as varying the capacity of the alining means to correspond to the size of the ear being debutted, where, as a matter of fact, the setting of the alining devices according to the size of the ear operated upon, enables the alining devices to find the grain shoulder and aline the ear thereby, regardless of whether the ear is a small ear, a large ear or of intermediate size. In each instance the capacity of the alining means is shifted or varied to correspond to the particular ear that is at that instance being alined.

It will be noted that the separating of the alining devices not only positions these alining devices so as to engage the grain shoulder for efficient positioning of the same, but this also permits a very large stalk or butt such as naturally is found on a large ear, to pass between the alining devices without any clogging of the machine. The feeding in rolls 33 and 34 yield to permit this butt or stalk to pass downwardly between the same. In Figure 21 of the drawings I have shown the butt indicated at E', severed from the ear E and it will be noted that the line *x—x* on which the ear is severed, is right at the grain shoulder of the ear, so that the husks are completely loosened from attachment with the butt of the ear and at the same time the grain is not wasted.

Figure 1:
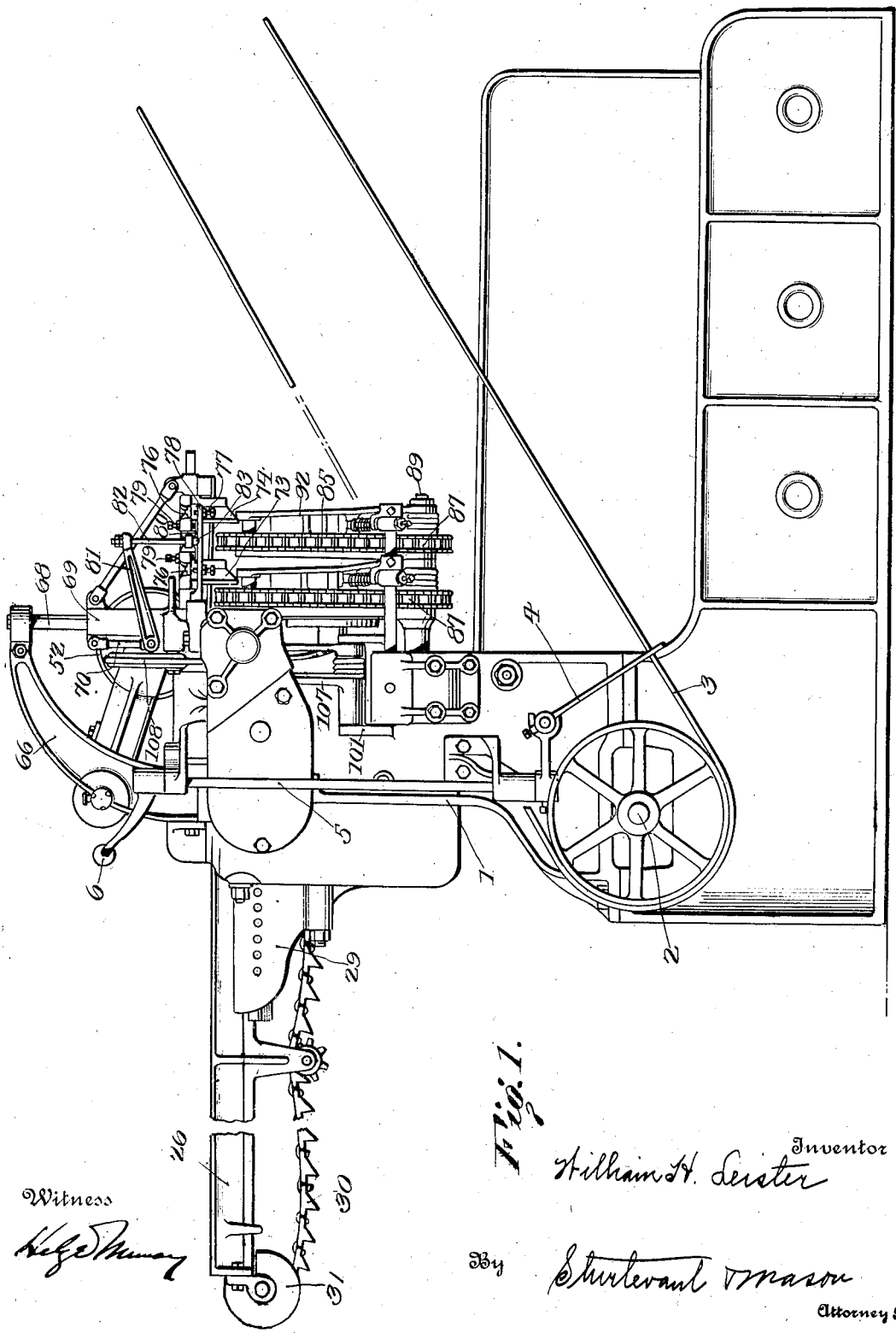
Figure 1 is a side view of a machine embodying my improvements.

The ears of corn after the ears have been severed therefrom drop into the husking machine which is shown in Figures 1 and 5 of the drawings. As herein shown the husking machine consists of two units each of which has a pair of husking rolls 132 and 133. Located between these husking units is a partition 134.

Mounted on the partition 134 is a distributor 135. This distributor is pivoted to the partition as indicated at 135ª and may rock on the partition from the full line position shown in Figure 5 to the dotted line position shown therein. When in the full line position shown in this figure, the upper end of the distributor extends to the left of the center of the machine so that an ear as it is dropped by the feed chains after they have been debutted, will strike the distributor and rock the same to the dotted line position and drop onto the right hand husking unit. This sets the distributor so that the next ear will be thrown onto the left hand husking unit and so on, equally distributing the ears, first on one husking unit and then the other. By this arrangement of a single debutting unit and a plurality of husking units, I am able to greatly increase the capacity of the machine as it is well known that the husking of the ear is a slower process than the debutting of the same. Furthermore by the utilizing of two husking units a longer period of time is given for the husking operation without unduly extending the length of the husking rolls. These husking rolls, as indicated in the drawings, are elliptical in cross section and may be constructed as shown, described and claimed in my co-pending application, Serial No. 192,366, filed September 20th, 1917.

The husking rolls are operated by bevel gears 136 which mesh with bevel gears 137 on the main shaft 2. (See Figure 4 of the drawings.) The stalk or butt cut from the ear drop into a chute 137' and is carried by this chute into a suitable receptacle.

From the above it will be apparent that I have provided a debutting machine which is capable of operating upon ears of corn varying greatly in shape and diameter and at the same time bring about an efficient positioning of the ears so that the butt will be severed from the ear substantially at the grain shoulder in every instance, thus efficiently releasing the hucks and without wasting any of the grain. It will also be noted that the machine is positive in operation and at the same time simple in construction. It will be further noted that the parts of the debutting machine are driven through a yielding clutch which prevents any possible bending or breaking of the parts through the locking of the parts of the machine.

It will be obvious that the details of construction may be greatly varied and that the arrangement of the parts may be also varied without departing from the spirit of the invention as set forth in the appended claims.

Having thus described my invention, what I claim as new and desire to secure by Letters Patent, is:

1. A debutting machine including in combination cutting devices, alining means for positioning the article for debutting and devices operated upon by the article for varying the capacity of the alining means to correspond to the size of the article debutted.

2. A corn debutting machine including cutting means, alining means operating upon the body of the ear proper to find the grain shoulder and for positioning the ear by the grain shoulder for debutting, and means for varying the capacity of the alining means to correspond to the size of the ear being debutted.

3. A corn debutting machine including cutting means, alining means operating upon the grain shoulder of the ear for positioning the ear for debutting, means for moving the ear endwise for causing the grain shoulder to approach the alining means from the body of the ear to engage said alining means and devices operated upon by the ear for varying the capacity of the alining means to correspond to the size of the ear being debutted.

4. A corn debutting machine including cutting means, alining means operating upon the grain shoulder of the ear for positioning the ear for debutting, means for moving the ear endwise and point first along the alining means and into engagement therewith and means operated by the ear for varying the capacity of the alining means to correspond to the size of the ear being debutted.

5. A corn debutting machine including in combination cutting means, alining means for positioning the ear relative to the cutting, means for moving the ears endwise and point first over the alining means, means for moving the ears sidewise for causing the alining means to find and position the ear by the grain shoulder of said ear and devices operated by the ear for varying the capacity of the alining means to correspond to the size of the ear being debutted.

6. A corn debutting machine including in combination cutting means, spaced alining devices engaging the ear at the butt for positioning the same relative to the cutting means, and devices operated by the ear for varying the space between the alining devices to correspond to the size of the ear being debutted.

7. A corn debutting machine including in combination cutting means, spaced alining devices for engaging the ear at the butt for positioning the same relative to the cutting means, a presser wheel adapted to engage said ear and movable vertically by said ear, devices operated by the presser wheel for varying the distance between the alining devices to correspond to the extent to which the presser wheel is lifted by the ear.

8. A corn debutting machine including in combination cutting means, spaced rotating alining devices, means for causing the butt of the ear to engage said alining devices whereby the ear is positioned thereby for the cutting means and devices operated upon by the ear for varying the distance between said alining devices to correspond to the size of the ear being debutted.

9. A corn debutting machine including in combination cutting means, spaced rotating alining devices, means for moving the ears one after the other point first over the alining devices, means for causing the alining devices to find and position the ear by the grain shoulder of the ear, means for feeding the ear after alined by said devices to the cutting means, and devices operated upon by the ear for positioning the alining devices to correspond to the size of the ear being debutted.

10. A corn debutting machine including in combination cutting means, opposed spaced alining devices, means for feeding the ear endwise and point first over the alining devices, retarding devices for holding the grain shoulder of the ear against the alining devices, a presser wheel engaging the ear, said presser wheel being raised by the ear, devices operated by the presser wheel for shifting the alining devices away from each other, whereby the alining devices may be set to properly aline the ear operated upon.

11. A corn debutting machine including in combination, cutting means, opposed alining devices, a rotating presser wheel co-operating therewith. means for feeding the ears between the alining devices and the presser wheel, means for retarding the ear to cause the grain shoulder to engage the alining device, means for feeding the ear after alined to the cutting means, and devices operated upon by the presser wheel for varying the space between the alining devices to correspond to the size of the ear being debutted.

12. A corn debutting machine including in combination cutting means, spaced opposed alining devices, means for positively rotating said devices, a presser wheel, means for rotating said presser wheel, means for feeding the ears one at a time point first between the alining devices and the presser wheel, means for retarding the movement of the ear to cause the corn shoulder to engage and follow the alining devices, and means operated by the presser wheel for setting the alining devices for the particular size ear being debutted.

13. A corn debutting machine including in combination cutting means, spaced opposed alining devices, means for positively rotating said devices, a presser wheel, means for rotating said presser wheel, means for feeding the ears one at a time point first between the alining devices and the presser wheel, means for retarding the movement of the ear to cause the corn shoulder to engage and follow the alining devices, and means operated by the presser wheel for setting the alining devices for the particular size ear being debutted, said last named devices including means for positively shifting the alining devices for setting the same, and yielding means for returning the alining devices to normal position after the ear has been moved from engagement therewith.

14. A corn debutting machine including in combination spaced alining devices having their surfaces tapered in opposite directions with the apexes of the tapered sections adjacent each other, means for positively rotating said devices, a presser wheel engaging the ear on the alining devices, means for positively rotating said presser wheel, devices operated by the presser wheel for positively moving the alining devices away from each other when an ear of corn passes between the presser wheel and the alining devices for setting the alining devices to correspond to the diameter of the ear passing over the same.

15. A corn debutting machine including in combination spaced alining devices having their surfaces tapered in opposite directions with the apexes of the tapered sections adjacent each other, means for positively rotating said devices, a presser wheel engaging the ear on the alining devices, means for positively rotating said presser wheel, devices operated by the presser wheel for positively moving the alining devices away from each other when an ear of corn passes between this presser wheel and the alining devices for setting the alining devices to correspond to the diameter of the ear passing over the same, and yielding means for returning the spacing devices to normal position after the ear of corn has been moved from engagement therewith.

16. A corn debutting machine including in combination cutting means, alining means including spaced members over which the ear passes to bring the grain shoulder into engagement with the alining means, means for feeding the ear to the alining means including feed rolls, means for positively rotating said feed rolls, and means for mounting the feed rolls whereby the same will yield to permit the stalk or butt to pass down between the same.

17. A corn debutting machine including in combination spaced alining devices, a presser wheel co-operating therewith, means for holding the grain shoulder against the alining devices, whereby the ear is alined by the grain shoulder, cutting means, devices for conveying the alined ear to the cutting means, and means for feeding the ear to the alining device including feed rolls, means for positively rotating the feed rolls, and means for supporting the feed rolls whereby the same may yield to permit the ear to be moved downwardly after it is alined, to the cutting means.

18. A corn debutting machine including in combination spaced alining devices, means operated by the ear for setting the alining devices corresponding to the size of the ear being debutted, means for feeding the ear onto the alining devices including feeding-in rolls, means for rotating the feeding-in rolls, and means for supporting the feeding-in rolls, whereby the same may yield to permit the stalk or butt to pass the same.

19. A corn debutting machine including in combination cutting means, alining devices for positioning the ear relative to the cutting means, a presser wheel co-operating with the alining devices for engaging the ear and causing the ear to travel point first over the alining devices, means for operating the alining devices and the presser wheel, means for moving the ear sidewise for causing the alining means to find and position the ear by the grain shoulder of said ear, means for moving the ear after alined to the cutting means, means for presenting the ears one after the other point first to the alining devices and presser wheel, said last named means including yieldingly mounted positively driven feeding-in rolls, whereby said feeding-in rolls may yield to permit the stalk or butt to pass between the alining devices and downwardly to the cutting means.

20. A corn debutting machine including in combination alining means, cutting means, spaced co-operating pairs of feeding devices for engaging the ear after it is alined and presenting the same to the cutting means.

21. A corn debutting machine including in combination alining means, cutting means, spaced co-operating pairs of traveling chains carrying teeth for engaging the ears at different points in its length for presenting the same to the cutting means.

22. A corn debutting machine including in combination, cutting means, alining devices for positioning the ear relative to the cutting means, means controlled by the ear for positively shifting said devices away from each other for setting the same for alining the ear, and spring means for returning said devices to normal position after the ear has moved from engagement with the same.

23. A corn debutting machine including in combination, cutting means, alining devices for positioning the ear relative to the cutting means, means for restraining the forward movement of the ear for holding the same against the alining devices, means for engaging the ear and movable thereby for separating the alining devices, and spring means for returning the alining devices after the ear has moved from engagement therewith.

24. A corn debutting machine including in combination, cutting means, alining means for positioning the ear relative to the cutting means, means for feeding the ear to the alining means including feed rolls, means for rotating said feed rolls, and means for mounting said feed rolls whereby the same way yield independently to permit the stalk or butt to pass the alining means.

25. A corn debutting machine including in combination, cutting means, alining means for positioning the ear relative to the cutting means, and means for feeding the ear to the alining means including feed rolls shaped so as to engage the ear at opposite side thereof for gripping the same for feeding the ear forward, means for operating the rolls, and means for independently and yieldingly supporting the rolls, whereby the same may yield to permit the ear to pass the alining means.

26. In apparatus of the character described, the combination, with butt-severing means, of mechanism for advancing an ear of corn into operative relation thereto, said mechanism including a pair of rotable ear-engaging members mounted in substantially horizontal axial alinement and relatively adjustable longitudinally on their common axis, another ear-engaging member rotatable on an axis substantially parallel to the first mentioned axis and movable toward and away from the other members to accommodate an ear advancing lengthwise between them transversely to said axes, and means whereby movement of such movable ear-engaging members effects longitudinal axial adjustment of the horizontally alined members.

27. In apparatus of the character described, the combination, with butt-severing means, of mechanism for advancing an ear of corn into operative relation thereto, said mechanism including adjustably spaced ear-engaging alinement members, and means operable by engagement with an advancing ear automatically to adjust the spacing of said members.

28. In apparatus of the character described, the combination, with butt-severing means, of mechanism for advancing an ear of corn into operative relation thereto, said mechanism including an ear-engaging device adjustable for ears of different diameters, an ear-engaging member so mounted as to be movable by an advancing ear, and suitable connecting means whereby movement of said members effects adjustment of said device.

29. In apparatus of the character described, the combination with butt-severing means, of mechanism for advancing an ear of corn into operative relation thereto, said mechanism including a pair of axially alined rolls having cooperating conoidal surfaces and being adapted to engage an ear advancing lengthwise transversely to the roll axis, said rolls being axially adjustable automatically with respect to each other.

30. In apparatus of the character described, the combination with butt-severing means, of mechanism for advancing an ear of corn into operative relation thereto, said mechanism including a pair of axially alined rolls having cooperating conoidal surfaces adapted to engage an ear advancing lengthwise transversely to the roll axis, said rolls being axially adjustable with respect to each other, and means arranged in the path of ear advance and movable to effect such adjustment.

31. In apparatus of the character described, the combination with butt-severing means, of mechanism for advancing an ear of corn into operative relation thereto, said mechanism including a pair of axially alined rolls having cooperating conoidal surfaces adapted to engage an ear advancing lengthwise transversely to the roll axis, said rolls being axially adjustable with respect to each other, a movably mounted roll arranged to be engaged by an advancing ear, and means for transmitting adjusting movement from the latter roll to said axially alined rolls.

32. In apparatus of the character described, the combination with butt-severing means, of mechanism for advancing an ear of corn into operative relation thereto, said mechanism including a pair of axially alined rolls having cooperating conoidal surfaces adapted to engage an ear advancing lengthwise transversely to the roll axis, said rolls being axially adjustable with respect to each other, a pivoted roll arranged to be engaged by an advancing ear, and cam means operable by pivotal movement of said pivoted roll to adjust said axially alined rolls.

33. In apparatus of the character described, the combination with butt-severing means, of mechanism for advancing an ear of corn into operative relation thereto, said mechanism including a pair of horizontally alined coned rolls revolubly mounted with their smaller ends adjacent, said rolls being capable of relative axial movement, a roll arranged above said coned rolls and rotatable on an axis parallel with theirs, all the said rolls cooperating to engage the periphery of an ear of corn passing lengthwise therebetween, such upper roll being so mounted as to be free to move up and down while resting on such ear to allow for variation in ear diameter, and means operable by the up and down movement of said upper roll to move said coned rolls axially for proper adjustment thereof.

34. In apparatus of the character described, in combination, a plurality of rolls having their rotation axes in substantially the same plane, said rolls being arranged to laterally engage and confine an ear of corn fed lengthwise therebetween and transversely of said plane, one of said rolls being yieldingly mounted to accommodate varying ear diameters, and connections whereby movement of such yielding roll effects a change in the axial position of another of said rolls.

35. A debutting machine including in combination a butt removing device, a feed-in table, means for feeding an article on said table to said butt removing device, an alining means, and an article engaging member connected to said alining means and movable by the advancing article for varying the capacity of said alining means to correspond to the size of the article being alined.

36. A debutting machine including in combination a butt removing device, a feed-in table, means for feeding the article on said table to said butt removing device, an alining means, and an article engaging member connected to said alining means and movable by the advancing article for varying the capacity of said alining means to correspond to the size of the article being alined, said connection between the article engaging member and the alining means including devices whereby said article engaging member may return to normal position without affecting the capacity of the alining means.

37. A debutting machine including in combination a butt removing device, alining devices for positioning the article for debutting, a yielding member operated by an advancing article and connected to said alining devices for varying the spacing between the alining devices, said connection between the alining devices and the yielding member including devices whereby said yielding member is free to return to its normal position without affecting the spacing between the alining devices.

38. A debutting machine including in combination a butt removing device, alining devices adapted to operate upon the grain-shoulder of the ear for positioning said ear for debutting, means for moving the ears endwise for causing the grain-shoulder to approach the alining devices from the body of the ear to engage said alining devices, a member connected to said alining devices and operated upon by the ear for varying the spacing between the alining devices to correspond to the size of the article being debutted, said connection between said member and the alining devices including devices whereby the member may return to its normal position without affecting the spacing between the alining devices.

39. A debutting machine including in combination a butt removing means, a plurality of devices arranged to laterally engage and confine an article fed lengthwise therebetween, one of said devices being yieldingly mounted to accommodate various diameters of articles and connections between said devices whereby movement of the yielding device effects a change in the spacing between the other devices.

40. A debutting machine including in combination a butt removing means, a plurality of devices arranged to laterally engage and confine an article fed lengthwise therebetween, one of said devices being yieldingly mounted to accommodate various diameters of articles and connections between said devices whereby movement of the yielding device effects a change in the spacing between the other devices, said connection between said devices including means whereby the yielding device is free to return to a normal position without affecting the spacing between the other devices.

41. A debutting machine including in combination a butt removing device, alining devices for positioning the article relative to the butt removing device, means controlled by the article and connected to one of said alining devices, for positively shifting said alining devices away from the other for setting said alining devices for alining the article, said connection including devices permitting said shifting means to be yieldingly returned to a normal position without affecting the spacing between the alining devices.

In testimony whereof, I affix my signature.

WILLIAM HAMMOND LEISTER.